US010402490B1

(12) United States Patent
Benavides (10) Patent No.: US 10,402,490 B1
(45) Date of Patent: Sep. 3, 2019

(54) EDIT DISTANCE BASED SPELLCHECK

(71) Applicant: SHUTTERSTOCK, INC., New York, NY (US)

(72) Inventor: Alberto Benavides, Brooklyn, NY (US)

(73) Assignee: Shutterstock, Inc., New York, NY (US)

(*) Notice: Subject to any disclaimer, the term of this patent is extended or adjusted under 35 U.S.C. 154(b) by 407 days.

(21) Appl. No.: 15/236,358

(22) Filed: Aug. 12, 2016

Related U.S. Application Data (60) Provisional application No. 62/205,618, filed on Aug. 14, 2015.

(51) Int. Cl.
*G06F 16/583* (2019.01)
*G06F 17/27* (2006.01)
*G06F 17/24* (2006.01)
*G06F 16/532* (2019.01)

(52) U.S. Cl.
CPC .......... *G06F 17/273* (2013.01); *G06F 16/532* (2019.01); *G06F 16/5846* (2019.01); *G06F 17/24* (2013.01); *G06F 17/2765* (2013.01)

(58) Field of Classification Search
CPC .................... G06F 17/273; G06F 17/30265
See application file for complete search history.

(56) References Cited

U.S. PATENT DOCUMENTS

| | | | | |
|---|---|---|---|---|
| 9,471,712 B2 * | 10/2016 | Oliver | ............ | H04L 51/12 |
| 2007/0288448 A1 * | 12/2007 | Datta | ............ | G06F 17/2795 |
| 2010/0306412 A1 * | 12/2010 | Therrien | ............ | H03M 7/3084 |
| | | | | 709/247 |
| 2013/0124492 A1 * | 5/2013 | Gao | ............ | G06F 17/273 |
| | | | | 707/706 |
| 2014/0327622 A1 * | 11/2014 | Ouyang | ............ | G06F 3/04897 |
| | | | | 345/169 |

* cited by examiner

*Primary Examiner* — Kris E Mackes
(74) *Attorney, Agent, or Firm* — McDermott Will & Emery LLP (57) ABSTRACT

Various aspects of the subject technology relate to systems, methods, and machine-readable media for edit distance based spellcheck. A system may include a search engine using edit distance based spellcheck covering a set of valid words in a language model describing probabilities for each candidate word. The subject system first identifies strings that are one edit away from a source word, selects at least one of the strings with the highest probability in the language model and uses that selected string as the spelling correction. If there are no valid words found, the subject system determines the edit distance between the source word and all candidate words in the language model whose length differential with the source word is smaller than a threshold and whose first character is the same as that of the source word, and selects the candidate word with the highest language probability and lowest edit distance.

20 Claims, 6 Drawing Sheets

EDIT DISTANCE BASED SPELLCHECK

CROSS-REFERENCE TO RELATED APPLICATIONS

This application claims the benefit of priority from U.S. Provisional Application No. 62/205,618, entitled "EDIT DISTANCE BASED SPELLCHECK," filed Aug. 14, 2015, the entirety of which is incorporated herein by reference.

BACKGROUND

Field

The present disclosure generally relates to a computer-based neural network for image retrieval, and more particularly to image retrieval using edit distance based spellcheck.

Description of the Related Art

Customers commonly search for content such as stock content items for producing a creative illustration using the searched stock content items. The customers can search for such stock content through a media collection. Certain search systems include spellcheck functionality for correcting misspelled search query terms. However, the latency grows exponentially in standard approaches to spellcheck as the number of variations in candidate corrections increases, thereby burdening the standard spellchecking experience with unnecessary delay.

SUMMARY

The disclosed system includes a search engine using edit distance based spellcheck covering a set of valid words in a language model describing probabilities for each candidate word. The subject system first identifies strings that are one edit away from a source word, selects at least one of the strings with the highest probability in the language model and uses that selected string as the spelling correction. If there are no valid words found, the subject system determines the edit distance between the source word and all candidate words in the language model whose length differential with the source word is smaller than a length threshold and whose first character is the same as that of the source word, and selects the candidate word with the highest language probability and lowest edit distance.

According to one embodiment of the present disclosure, a computer-implemented method is provided for processing a source term in an image search query from a requesting client device, the source term including at least one misspelled character; iterating through each term of a set of candidate terms to identify a candidate term having a smallest edit distance from the source term, the candidate term having a difference in length from the source term that is smaller than a predetermined length threshold; modifying the source term in the image search query with the candidate term as a spelling correction for the source term; and providing the image search query modified with the candidate term to an image search service for retrieving one or more data items responsive to the image search query.

According to one embodiment of the present disclosure, a system is provided including one or more processors and a computer-readable storage medium coupled to the one or more processors, the computer-readable storage medium including instructions that, when executed by the one or more processors, cause the one or more processors to process a source term associated with an image search query from a requesting client device, the source term including at least one misspelled character; generate a set of strings in a language model that include at least one character in common with the source term, the set of strings including one or more strings with a difference in length from the source term that is smaller than a predetermined length threshold, the one or more strings having an edit distance from the source term that is equivalent to a smallest edit distance in the set of strings, each of the one or more strings having a respective language probability; select a string with a highest language probability of being a spelling correction from the one or more strings; modify the source term in the image search query with the selected string as a spelling correction for the source term; and provide the image search query modified with the selected string to an image search service for retrieving one or more data items responsive to the image search query.

According to one embodiment of the present disclosure, a non-transitory computer readable storage medium is provided including instructions that, when executed by one or more processors, cause the one or more processors to receive user input associated with an image search query from a requesting client device; identify a source term from the user input, the source term including at least one misspelled character; determine a first set of strings having at least one character in common with the source term; determine a second set of strings from the first set of strings, each string in the second set of strings having a difference in length from the source term that is smaller than a predetermined length threshold; determine an edit distance between each string in the second set of strings and the source term; identify a third set of strings from the second set of strings whose edit distance is equivalent to a smallest edit distance in the second set of strings; select a string with a highest language probability among strings in the third set of strings, the highest language probability indicating that the selected string has a greatest likelihood of being a spelling correction; retrieve one or more data items responsive to the image search query using the selected string; and provide the retrieved one or more data items for display to the requesting client device.

According to one embodiment of the present disclosure, a system is provided for retrieving a set of images identified as responsive to an image search query that includes one or more source terms spellchecked by an edit distance based spellcheck. The system includes means for receiving a user input associated with an image search query from a requesting client device; and means for: 1) processing a source term in the user input, the source term including at least one misspelled character; 2) iterating through each term of a set of candidate terms to identify a candidate term having a smallest edit distance from the source term, the candidate term having a difference in length from the source term that is smaller than a predetermined length threshold; 3) modifying the source term in the image search query with the candidate term as a spelling correction for the source term; and 4) providing the image search query modified with the candidate term to an image search service for retrieving one or more data items responsive to the image search query.

According to one embodiment of the present disclosure, a computer-implemented method is provided for receiving user input via an application on a client device; determining, on the client device, a source term in the user input, the source term including at least one misspelled character; generating, in response to the received user input, an image search query including the source term; providing for transmission the image search query over a connection to a server, the server including an edit distance based spellcheck service that iterates through each term of a set of candidate terms accessible to the server to identify a candidate term having a smallest edit distance from the source term, the candidate term having a difference in length from the source term that is smaller than a predetermined length threshold, the source term in the image search query being modified with the candidate term as a spelling correction for the source term at the server, the image search query modified with the candidate term being provided to an image search service accessible to the server for retrieving one or more data items responsive to the modified image search query; receiving the one or more data items over the connection; and providing for display a listing of the one or more data items.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the images and detailed description are to be regarded as illustrative in nature and not as restrictive.

BRIEF DESCRIPTION OF THE IMAGES

The accompanying images, which are included to provide further understanding and are incorporated in and constitute a part of this specification, illustrate disclosed embodiments and together with the description serve to explain the principles of the disclosed embodiments. In the images.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

In an information retrieval (IR) system, a content repository can include content (e.g., images, videos, audio, etc.) that may be searched using one or more search query terms. The IR system may use search query terms and/or other user input to perform a search through the content repository.

When a user performs a search, the IR system matches a user's search query terms with content items that are most relevant to a user's query. Certain search systems include spellcheck functionality for correcting misspelled search query terms, and then performing the image search using that spellchecked term. However, there is a problem with current image search engines using standard spellcheck techniques in that when a user searches with spellcheck, the standard techniques typically yield an exponential number of possible corrected search query terms, thereby burdening the spellchecking experience with unnecessary terms.

The disclosed system addresses this problem specifically arising in the realm of computer technology by providing a solution also rooted in computer technology, namely, by the configuration of a computer-operated dynamic programming network, such as a natural language processing network, to limit the number of common variants of a source term that serve as correctly spelt terms in a search space by identifying strings that are limited in length and edit distance with respect to the source term and probability among candidate terms. For example, the disclosed implementations address these example challenges by considering a search engine system using an enhanced edit distance based spellcheck system. The disclosed system provides the advantage of significantly reducing the search space of candidate corrections. The subject system includes a set of valid words in a given natural language along with a language model describing probabilities for each of the candidate valid words.

The disclosed system includes one or more processors and a memory storing instructions, which when executed by the one or more processors, cause the subject system to: (1) generate all strings that are one edit away from a source word; (2) select at least one of the strings with the highest probability in the language model and use that selected string as the spelling correction; (3) if there are no valid words found, determine by computation the edit distance between the source word and all words in the language model (a) whose length differential with respect to the source word is smaller than a predetermined length threshold D and (b) whose first character is the same as the source word's first character; and (4) select the one with the highest probability and lowest edit distance. The disclosed system can accept a search query identifying a search term in a given natural language to search against images, and provide images responsive to the search query. In this respect, the disclosed system can retrieve images using a spellchecked search query derived from correctly spelt strings with the lowest edit distance and highest language probability.

The proposed solution further provides improvements to the functioning of the computer itself because it saves data storage space and reduces latency in the system. Specifically, the computer hosting the edit distance based spellcheck is not required to maintain an exponential number of candidate terms in data storage nor required to iterate through the exponential number of candidate terms to identify the least dissimilar variant of the misspelled term because the natural language processing network, once trained, is configured to iterate through a search subspace that includes a reduced number of terms with the lowest edit distance and with the highest language probability, thereby reducing the overall system's latency in yielding the spelling correction.

Although many examples provided herein describe a user's search inputs being identifiable, or search history for images by a given natural language being stored, each user must grant explicit permission for such user information to be shared or stored. The explicit permission may be granted using privacy controls integrated into the disclosed system. Each user may be provided notice that such user information will be shared with explicit consent, and each user may at any time terminate having the information shared, and may delete any stored user information. The stored user information may be encrypted to protect user security.

Figure 1:
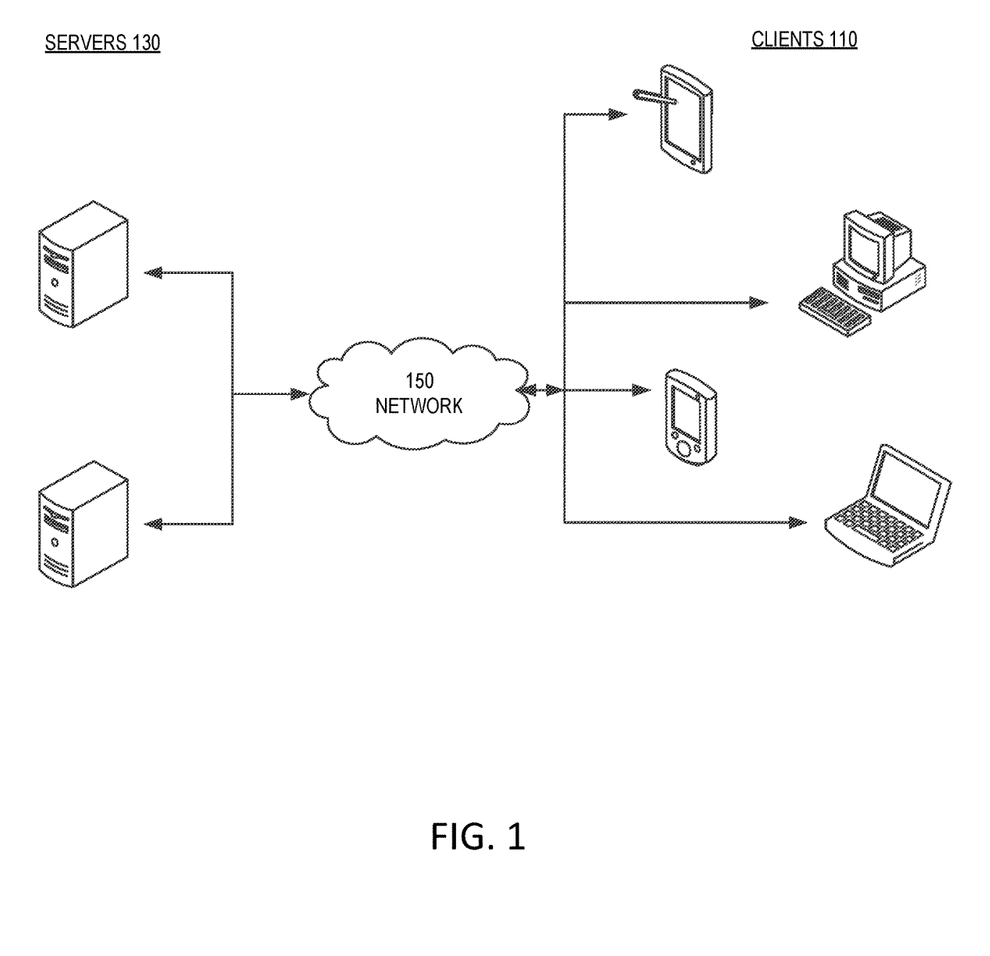
FIG. 1 illustrates an example architecture for an edit distance based spellcheck system suitable for practicing some implementations of the disclosure.

FIG. 1 illustrates an example architecture 100 for an edit distance based spellcheck system suitable for practicing some implementations of the disclosure. The example architecture 100 provides for a set of content items identified as responsive to a content search query processed by an edit distance based spellcheck of one or more source terms in the content search query. The architecture 100 includes servers 130 and clients 110 connected over a network 150.

One of the many servers 130 is configured to host a computer-operated natural language processing network. The natural language processing network, which can be a convolutional neural network, is trained to identify candidate correctly spelt queries with the lowest edit distance from the source term and with the highest language probability to use as spelling corrections. One of the many servers 130 also hosts a collection of content items. The collection of content items can be searched using a content search engine (e.g., accessible through a web page on one of the clients 110). The servers 130 can return content items to the clients 110 in response to a search query identifying a corrected version of the source term through the edit distance based spellcheck. For purposes of load balancing, multiple servers 130 can host the natural language processing network and multiple servers 130 can host the collection of content items.

The servers 130 can be any device having an appropriate processor, memory, and communications capability for hosting the natural language processing network, the collection of content items, and the content search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the content search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

In some embodiments, the content items include images, audio, video, multimedia, metadata, or the like. In one or more implementations, the content search engine includes an image search engine, an audio search engine, a video search engine or the like. In one or more implementations, the content search query includes an image search query, an audio search query, a video search query or the like. In one or more implementations, the collection of content items may refer to a collection of images.

Figure 2:
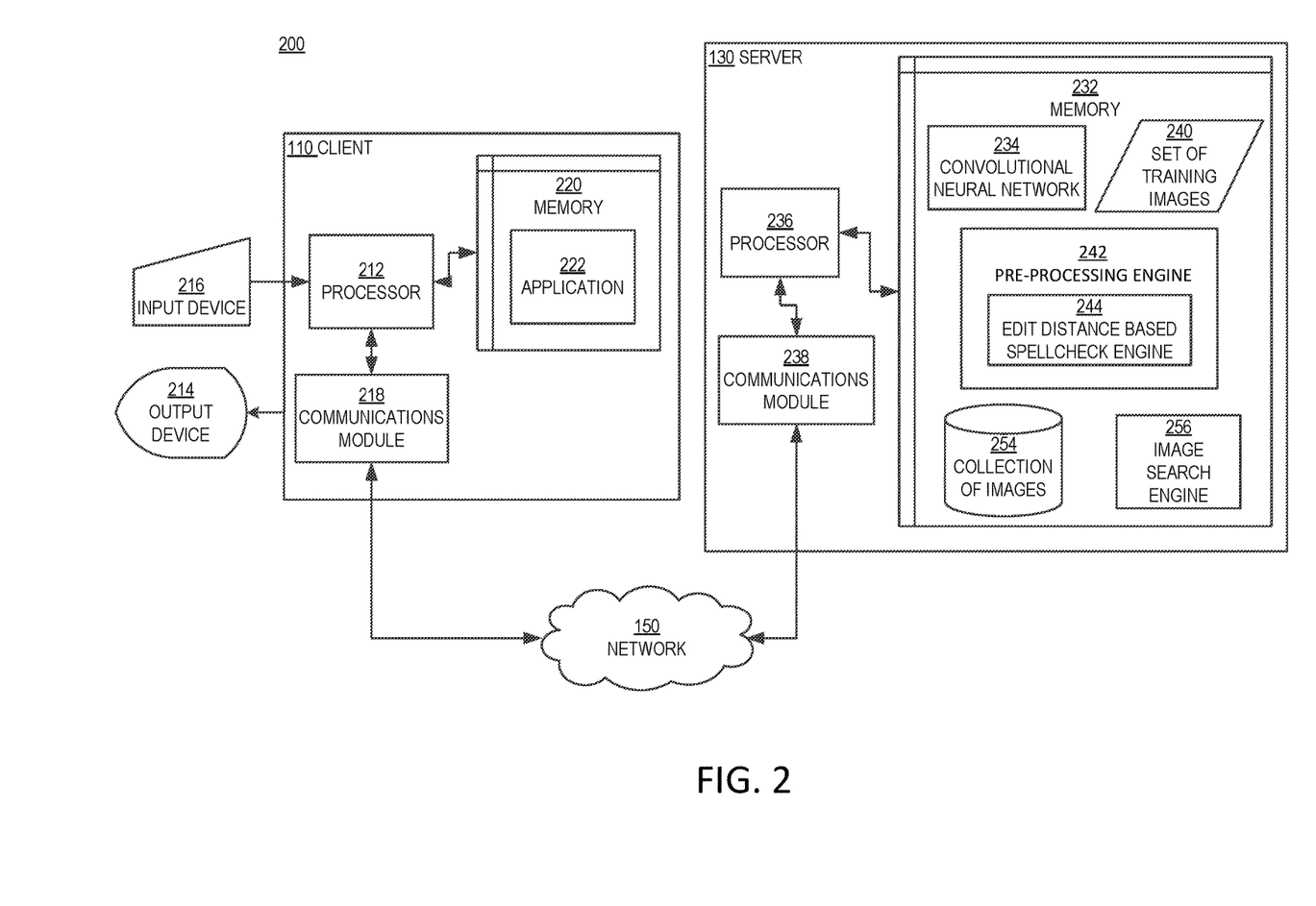
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232. The memory 232 of the server 130 includes a convolutional neural network 234. In certain aspects, the convolutional neural network 234 consists of a stack of convolutional layers followed by several fully connected layers. The convolutional neural network 234 can include a loss layer (e.g., softmax or hinge loss layer) to back propagate errors so that the convolutional neural network 234 learns and adjusts its weights to better fit provided image data and/or natural language data.

The memory 232 also includes a collection of images 254 and an image search engine 256 for searching the collection of images 254. Also included in the memory 232 of the server 130 is a set of training images 240. The set of training images 240 can be, for example, a dataset of image content items for training the convolutional neural network to recognize visual patterns in image data. The collection of images 254 can be, for example, a dataset of images with image vector information that identifies vectors representing a large sample of images (e.g., about 50 million).

Although the set of training images 240 is illustrated as being separate from the collection of images 254, in certain aspects the set of training images 240 is a subset of the collection of images 254. Furthermore, although the collection of images 254 and the image search engine 256 are illustrated as being in the same memory 232 of a server 130 as the convolutional neural network 234, in certain aspects the collection of images 254 and the image search engine 256 can be hosted in a memory of a different server but accessible by the server 130 illustrated in FIG. 2.

In certain aspects, the processor 236 of the server 130 is configured to receive a user input from a user. The user input identifies a search query associated with a given natural language. For example, the search query may be entered as an English term. In this respect, the search query in the given natural language is provisioned to the image search engine 256 for initiating the image search through the collection of images 254. The user input is provided, for example, by the user accessing the image search engine 256 over the network 150 using an application 222 in memory 220 on a client 110 of the user, and the user submitting the user input using an input device 216 of the client 110. For example, the user may use the input device 216 to enter the text-based search term or phrase in the given natural language. In response to the user input for the search query, a processor of the client 110 is configured to transmit the search query over the network 150 using the communications module 218 of the client 110 to the communications module 238 of the server 130. As described herein, the number of natural languages used is not limited to English, and the number of natural languages can vary to include other natural languages depending on implementation.

A user of the client 110 may use the input device 216 to submit a search term or phrase in the given natural language via a user interface of the application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part).

The memory 232 also includes a pre-processing engine 242. The pre-processing engine 242 includes an edit distance based spellcheck engine 244. The processor 236 of the server 130, upon receiving the search query for the image search engine 256, is configured to submit the search query to the pre-processing engine 242. After pre-processing of the search query by the pre-processing engine 242, the pre-processing engine 242 submits the pre-processed search query (e.g., spellchecked query) to the image search engine 256. The processor 236 then receives an identification of a plurality of images from the collection of images 254 that are responsive to the search query, and is configured to provide a listing of the plurality of images with a ranking (or prioritization). The processor 236 may then provide the listing to the application 222 on the client 110 over the network 150 for display by an output device 214 of the client 110.

The processor 236 of the server 130 is configured to execute instructions, such as instructions physically coded into the processor 236, instructions received from software in memory 232, or a combination of both. For example, the processor 236 of the server 130, using the pre-processing engine 242, executes instructions to process a user input from a user before forwarding a request and/or data from the user input to the image search engine 156. The pre-processing engine 242 receives user input associated with an image search query from the client 110. The processor 236, using the edit distance based spellcheck engine 244, processes the user input to check for any misspelled search queries. In some aspects, the edit distance based spellcheck engine 244 identifies a source term from the user input, in which the source term includes at least one misspelled character. In one or more implementations, the processor 236, using the pre-processing engine 242, accesses a dictionary of known terms along with their frequencies in a given natural language. The dictionary may compile terms that are known to be correctly spelt from one or more data sources accessible to the pre-processing engine 242. The dictionary may be stored in the memory 232 or separate from the memory 232 with access to the pre-processing engine 242 via an application programming interface (API) depending on implementation. If the source term from the user input (i.e., the user-provided term) is not found in the dictionary, then the pre-processing engine 242 determines that the term is misspelled. The pre-processing engine 242 may parse the user input to identify one or more character strings that make up the source term. As used herein, the term "source term" refers to an individual word or phrase submitted by the user to initiate an image search query, whereas the term "candidate term" refers to a possible variant of the individual word or phrase in the source term, where the "candidate term" is intended to be a correctly spelt version of the source term.

To set up the search space of possible spellcheck variants, the processor 236, using the edit distance based spellcheck engine 244, obtains a large number of terms (e.g., about 100,000 common words) from one or more data sources for each natural language (e.g., English, Spanish, French, German, etc.). The pre-processing engine 242 may determine a frequency at which terms are searched in a respective natural language. For example, the pre-processing engine 242 may determine how frequently a word is searched, how frequently a word is selected (e.g., a click-through rate), how frequently a word appears in a search result, how frequently a word is misspelled, and the like. The pre-processing engine 242 may then identify strings of characters from the terms having a frequency that exceeds a predetermined frequency threshold.

The pre-processing engine 242 may determine an initial set of candidate terms from the identified strings of characters based on the determined frequencies. The initial set of candidate terms may be determined for each language model of multiple language models, where each language model represents a distribution waveform that indicates a language probability for each candidate term in the set of candidate terms for a corresponding natural language. The language probability may indicate a likelihood of the term being used as a spelling correction for the source term. In some aspects, the language probability indicates a likelihood that the string is the intended source term for the image search query. In some embodiments, the language probabilities of all words (or terms) in the set of candidate terms sum up to 1.0. For example, a source term spelled as "can" may yield several candidate terms such as "cart," "cars," "car," "cat" or "can" to name a few, and each may have a varying degree of probability as being the proper spelling correction for the term "carr." If the intended source term for the search query is "cart," then its corresponding probability may indicate a value of 0.75 to refer to as the most likely choice, whereas the next possible candidate term ("cars") may have a corresponding probability of 0.20, and the remaining candidate terms may have smaller individual probabilities (e.g., 0.02, 0.01) to refer to as the least likely choices.

For a first pass-thru in identifying a spelling correction among the initial set of candidate terms, the processor 236, using the edit distance based spellcheck engine 244, may determine whether a valid word exists among the initial set of candidate terms. In some aspects, the valid word may refer to a variant term that is one spelling correction operation from the source term (i.e., edit distance of 1). In finding the valid word, the edit distance based spellcheck engine 244 computes the edit distance of each of the terms in the initial set of candidate terms with respect to the source term to identify terms with an edit distance of 1. If a valid word exists, the number of terms from the initial set of candidate terms with an edit distance of 1 yields an initial subset of candidate terms. The edit distance based spellcheck engine 244 may look up the corresponding language probabilities from the language model for each term in the initial subset of candidate terms. The edit distance based spellcheck engine 244 may then select the term with a highest language probability from the initial subset of candidate terms. The edit distance based spellcheck engine 244 then provides the selected term as the spelling correction.

If no valid word exists (or no term with an edit distance of 1 exists), then the processor 236, using the edit distance based spellcheck engine 244, determines a first set of candidate terms from all terms in the language model that have at least one character in common with the source term. In some aspects, the edit distance based spellcheck engine 244 generates the first set of candidate terms that includes character strings that start with a same first character as that of the source term. In other aspects, the first set of candidate terms is generated with terms having at least two consecutive characters in common with the source term. In this example, the first set of candidate terms is a subset of the initial set of candidate terms.

In turn, the processor 236, using the edit distance based spellcheck engine 244, determines a second set of candidate terms from the first set of candidate terms, where each character string in the second set of candidate term has a difference in length from the source term that is smaller than a predetermined length threshold. In this respect, the difference in the number of characters between each term in the second set of candidate terms and the source term would be no greater than a value equivalent to the predetermined length threshold. The length difference between the source term and each term in the second set of candidate terms may be in a range of 0 to 3 characters in some embodiments, or in a range of 0 to 4 characters in other embodiments, where the predetermined length threshold corresponds to the maximum value in the range (e.g., 3, 4). In this example, the second set of candidate terms is a subset of the first set of candidate terms.

In some embodiments, the edit distance based spellcheck engine 244 iterates through each term in the first set of candidate terms to determine a length for each term. The edit distance based spellcheck engine 244 then compares the determined length of each term in the first set of candidate terms to a length of the source term to compute the difference in length, and compares the computed lengths against the predetermined length threshold. The terms from the first set of candidate terms that satisfy the predetermined length threshold are grouped to form the second set of candidate terms. In some aspects, the comparison against the predetermined length threshold may not yield any terms. The edit distance based spellcheck engine 244 may not return a spelling correction for the source term because no appropriate candidate terms were found. In this respect, the source term as originally received by the pre-processing engine 242 is then forwarded to the image search engine 256 for initiating the image search.

If the second set of candidate terms includes at least one term as a possible spellcheck variant, then the edit distance based spellcheck engine 244 may determine the edit distance between the source term and each term in the second set of candidate terms. The processor 236, using the edit distance based spellcheck engine 244, iterates through each term in the second set of candidate terms to identify a candidate term having a smallest edit distance from the source term. There may be more than one term from the second set of candidate terms whose edit distance is equivalent to the smallest edit distance in the second set of candidate terms. This grouping of terms forms a third set of candidate terms, which is a subset of the second set of candidate terms.

The processor 236, using the edit distance based spellcheck engine 244, then selects a term with a language probability that is equal to a highest language probability in the third set of candidate terms. The highest language probability may indicate that the selected term has a greatest likelihood of being a spelling correction for the source term. The language model may include probabilities determined based on either a pattern of characters in the source term or context information in the image search query. The context information may refer to a phrase from which the source term may have been parsed.

In some embodiments, the processor 236, using the edit distance based spellcheck engine 244, modifies the source term in the image search query with the selected candidate term as a spelling correction for the source term. For example, the edit distance based spellcheck engine 244 may modify one or more values in the image search query that include the source term such that the values are updated to reflect a correctly spelt term. In some implementations, the spelling corrections performed by the edit distance based spellcheck engine 244 includes one or more of an insertion of a character, a deletion of a character, a substitution of a character, or a transposition of two adjacent characters.

In some embodiments, the processor 236, using the edit distance based spellcheck engine 244, generates metadata associated with the spelling correction to collect information relating to the outcome of the edit distance based spellcheck. The metadata may indicate one or more pieces of information such as whether the source term was spellchecked completely or partially, or whether the spellcheck terminated without a spelling correction due to an unknown (or unidentifiable) word or phrase in the source term. The processor 236, using the edit distance based spellcheck engine 244, may provide the metadata with the selected candidate term to the image search engine 256. In one or more implementations, the processor 236, using the edit distance based spellcheck engine 244, may provide for transmission, to the client 110 via the communications module 238, a notification indicating that the image search query is modified with the selected candidate term as a corrected version of the source term in the original image search query. In other implementations, the edit distance based spellcheck engine 244 may include a notification to the client 110 indicating that a spelling correction was not returned when no appropriate candidate term is found to perform the spelling correction.

The processor 236 of the server 130 is configured to submit a plurality of training images (e.g., the set of training images 240) to the convolutional neural network 234 that is configured to analyze image pixel data for each of the plurality of training images to identify features, in each of the plurality of training images and receive, from the convolutional neural network 234 and for each of the plurality of training images, extracted features corresponding to the image processed by the convolutional neural network 234. Once the convolutional neural network has been trained to predict which features of the set of training images 240 represent a given image search query, the trained neural network generates vectors for each of the corresponding training images.

Figure 3:
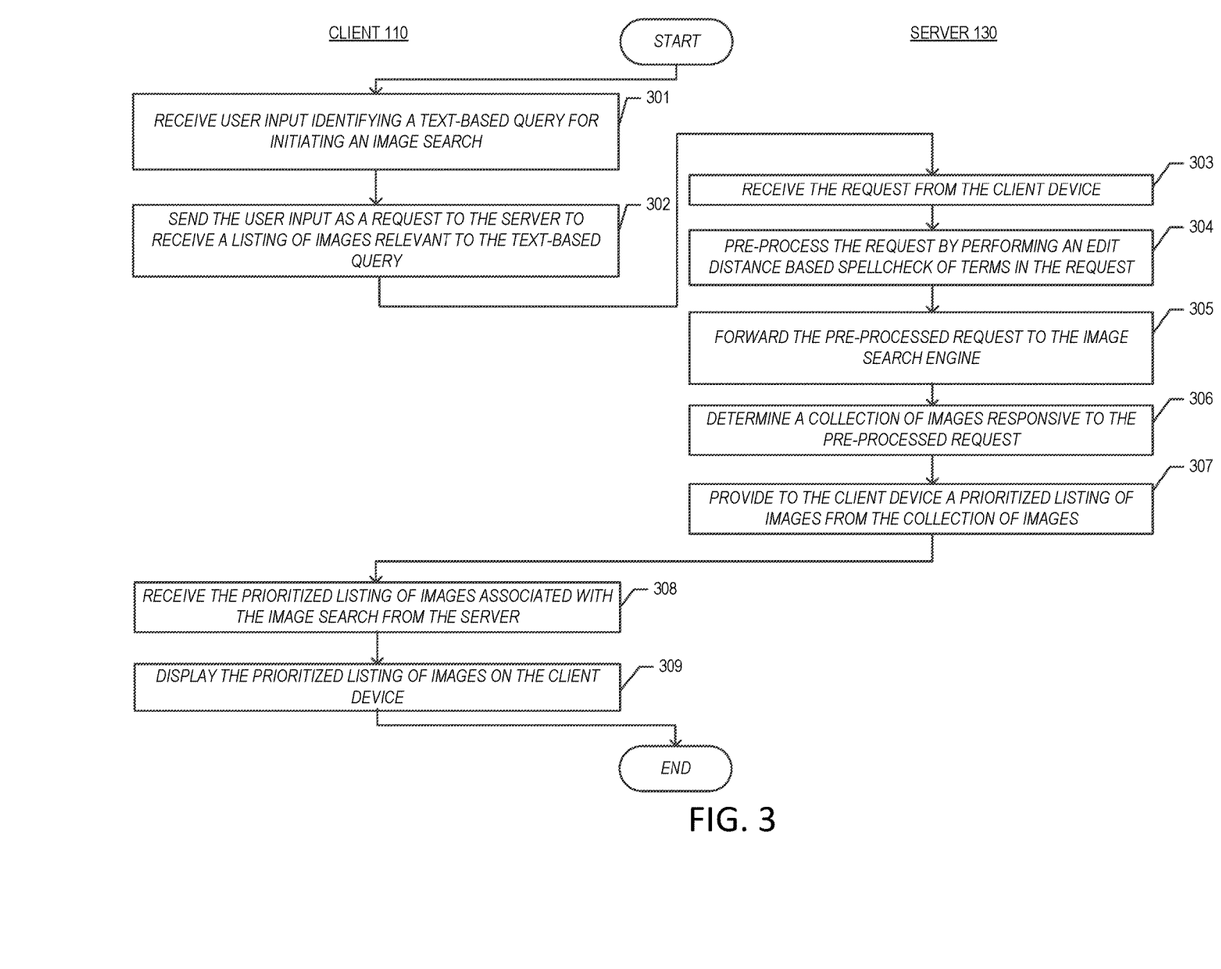
FIG. 3 illustrates an example process for an image search with edit distance based spellcheck using the example client and server of FIG. 2.

FIG. 3 illustrates an example process 300 for an image search with edit distance based spellcheck using the example client and server of FIG. 2. The process 300 begins in step 301 when a user, for example, loads an application 222 on a client 110 and the client 110 receives an input from the user using the input device 216 for a search query for a collection of images 254. The input identifies one or more search terms in a given natural language for initiating an image search. In this respect, the image search engine may identify images that are responsive to a spellchecked search query in a given natural language (e.g., French, German, Spanish, etc.).

Next, in step 302, the application 222 on the client 110 sends the user input as a request to the server 130 in order to receive a listing of images responsive to the text-based search query. Turning to the server 130, in step 303, the server 130 receives the user input for the search query for a collection of images from the client 110.

Subsequently, in step 304, the server 130 pre-processes the text-based search query by performing an edit distance based spellcheck of one or more terms in the request. In this step, the spellcheck variants available represent a subset of the overall number of terms in the search space for performing the edit distance based spellcheck, thereby alleviating the spellcheck burden by reducing the volume of terms to search against. In step 305, the processor 236 of the server 130 forwards the pre-processed request to the image search engine. The image search engine receives either a modified search query if a spelling correction was rendered or the original search query if no spelling correction was rendered.

Next, in step 306, an identification of images from the collection of images 254 that are responsive to the search query is received. In this respect, the images represent a subset of the overall number of images in the collection of images 254, thereby alleviating the image search burden by reducing the volume of images to search against.

Subsequently, in step 307 the server 130 provides the client 110 with a listing of the images that is prioritized by the amount of relevance to the search query. Turning to the client 110, in step 308, the client 110 receives the listing of the images associated with the image search from the server 130. Next, in step 309, the prioritized listing of the images is provided for display via the application 222 of the client 110.

Figure 4:
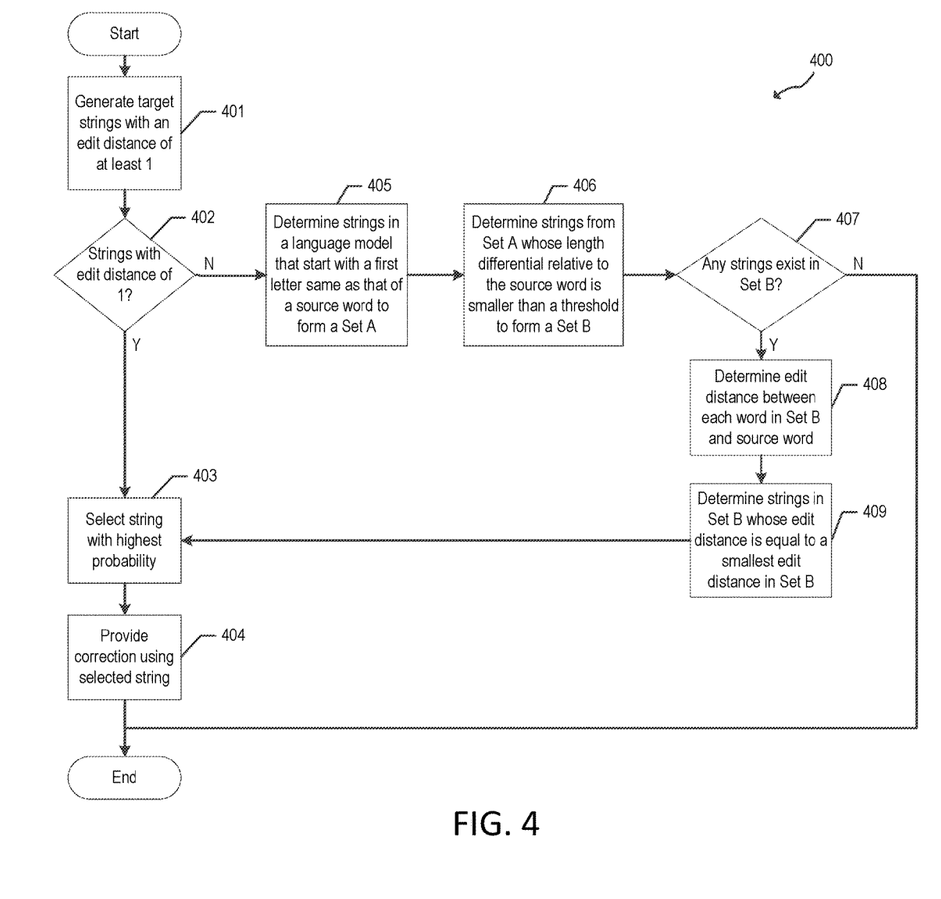
FIG. 4 illustrates an example process for edit distance based spellcheck.

FIG. 4 illustrates an example process 400 for practicing implementations of the subject technology using the example system of FIG. 1. For example, the operations described in reference to FIG. 4 may be performed using the pre-processing engine 242 and/or the edit distance based spellcheck engine 244.

The subject system relates to an edit distance based spellcheck system where automatic spelling corrections may be performed by determining candidate corrections having a certain edit distance from a misspelled string (or word). As used herein, the term "edit distance" refers to a representation of quantifying how dissimilar two strings (or words) are to one another by determining a number of operations needed to modify one string into the other string.

In some aspects, the operations performed by the edit distance based spellcheck engine 244, for example, in transforming the source word into a valid string include one or more of an insertion operation (e.g., inserting a symbol or character "c" into a source string "ab" to produce corrected string "abc"), a deletion operation (e.g., deleting a symbol or character "c" from a source string "abc" to produce corrected string "ab"), a substitution operation (e.g., substituting a symbol or character "c" for a symbol "d" to transform a source string "abc" to produce corrected string "abd") or a transposition operation (e.g., transposing adjacent symbols or characters "b" and "c" in a source string "abc" to produce corrected string "acb").

The edit distance based spellcheck engine 244 may be pre-configured with a set of valid strings (or words) in a given natural language along with a language model describing probabilities for each of the candidate valid strings. In some aspects, the set of valid strings may include words from a dictionary in a given natural language (e.g., English, French, Latin, or the like). The language model may refer to a two-dimensional probability waveform where the horizontal dimension (or x-axis) represents the set of valid strings and the vertical dimension (or y-axis) represents the probability (or likelihood) that each string in the set of strings is likely to be part of the input search query (or serve as the spelling correction).

The edit distance based spellcheck engine 244 may identify one or more strings from the initial set of strings that are one operation away from transforming the source word (e.g., the misspelled word) into the identified string (401).

In one or more implementations, the edit distance based spellcheck engine 244 may first determine which of the initial set of valid strings has an edit distance no greater than 1 relative to the source word (402). In this regard, the edit distance based spellcheck engine 244 may perform a comparison between the source word and each string of the set of valid strings to identify a subset of strings satisfying the edit distance of 1. If the edit distance based spellcheck engine 244 determines that a subset of strings with an edit distance of 1 exists, then the process 400 proceeds to identify the string with the highest language probability (403). Otherwise, the process 400 proceeds to perform a comparison between the first character of the source word with the first character of each string in the target language (405). In other embodiments, the initial set of strings may be filtered using a different criterion such as identifying those strings with an edit distance of 4 or smaller relative to the source word. In other aspects, the edit distance based spellcheck engine 244 determines variations of the source word up to an edit distance of 3 but the edit distance value relative to the source word may vary depending on implementation.

Given the subset of strings having an edit distance of 1 with respect to the source word, the edit distance based spellcheck engine 244 may select at least one of the strings with the highest probability in the language model (403). In this regard, there may be strings associated with different probabilities based on the language model. The string with the highest probability represents the greatest likelihood of that string representing the intended search term in the input query. The edit distance based spellcheck engine 244 uses the selected string as the spelling correction such that the source word is transformed into the selected string (404). In this respect, the original search query may be modified to replace the misspelled source word with the selected string.

In one or more implementations, if there are no valid words found from the initial set of valid strings, the edit distance based spellcheck engine 244 may determine whether the first character of each string in the given natural language is the same as the source word's first character, forming a set A (405). In contrast to a standard edit distance based spellcheck, the edit distance based spellcheck engine 244 further refines the initial set of valid strings to a smaller search space by identifying candidate corrections having a high similarity to the source word by identifying strings that start with the same character (or letter) as that of the source word, thereby reducing the overall system's latency in yielding the spelling correction.

For each string in Set A, the edit distance based spellcheck engine 244 determines whether a length differential between the string and the source word is smaller than a distance threshold D, where D is a positive integer, forming a set B (406). In this embodiment, the edit distance based spellcheck engine 244 iterates through each string in Set A to perform the differential computation. In some aspects, the threshold represents a maximum length differential relative to the source word (e.g., no more than four characters or symbols difference from the length of the source word where the threshold is set to 4). In other aspects, the edit distance based spellcheck engine 244 compares an edit distance differential between the source word and the string of set A against the threshold. For example, each string of set B may represent a string being no more than X edit operations (or spelling correction operations) from the source word, where X refers to the threshold value.

The edit distance based spellcheck engine 244 then determines whether any strings exist in set B (e.g., strings that start with the same first character as that of the source word and are within a threshold differential from the source word) (407). If the edit distance based spellcheck engine 244 does not identify any strings within Set B, the edit distance based spellcheck engine 244 may end the spellcheck process by not returning a spellcheck correction because no valid candidate corrections were available in Set B. Otherwise, the process 400 proceeds to determining by computation the edit distance between the source word and each string in the Set B (408). In step 408, the edit distance based spellcheck engine 244 iterates through each string in Set B to perform the edit distance computations. Each of the computed edit distances may be associated with its respective string such that the edit distance based spellcheck engine 244 may identify the strings using a range of desired edit distances. In determining the edit distances for the strings of Set B, the edit distance based spellcheck engine 244 determines strings in Set B whose edit distance is equal to Y, where Y refers to the smallest edit distance in Set B (409).

In identifying the strings with an edit distance satisfying the differential threshold and having a common first character with the source word, the edit distance based spellcheck engine 244 selects one of the strings in Set B with the highest probability in the language model (403). Thereafter, the edit distance based spellcheck engine 244 uses that selected string as the spelling correction (404).

Figure 5:
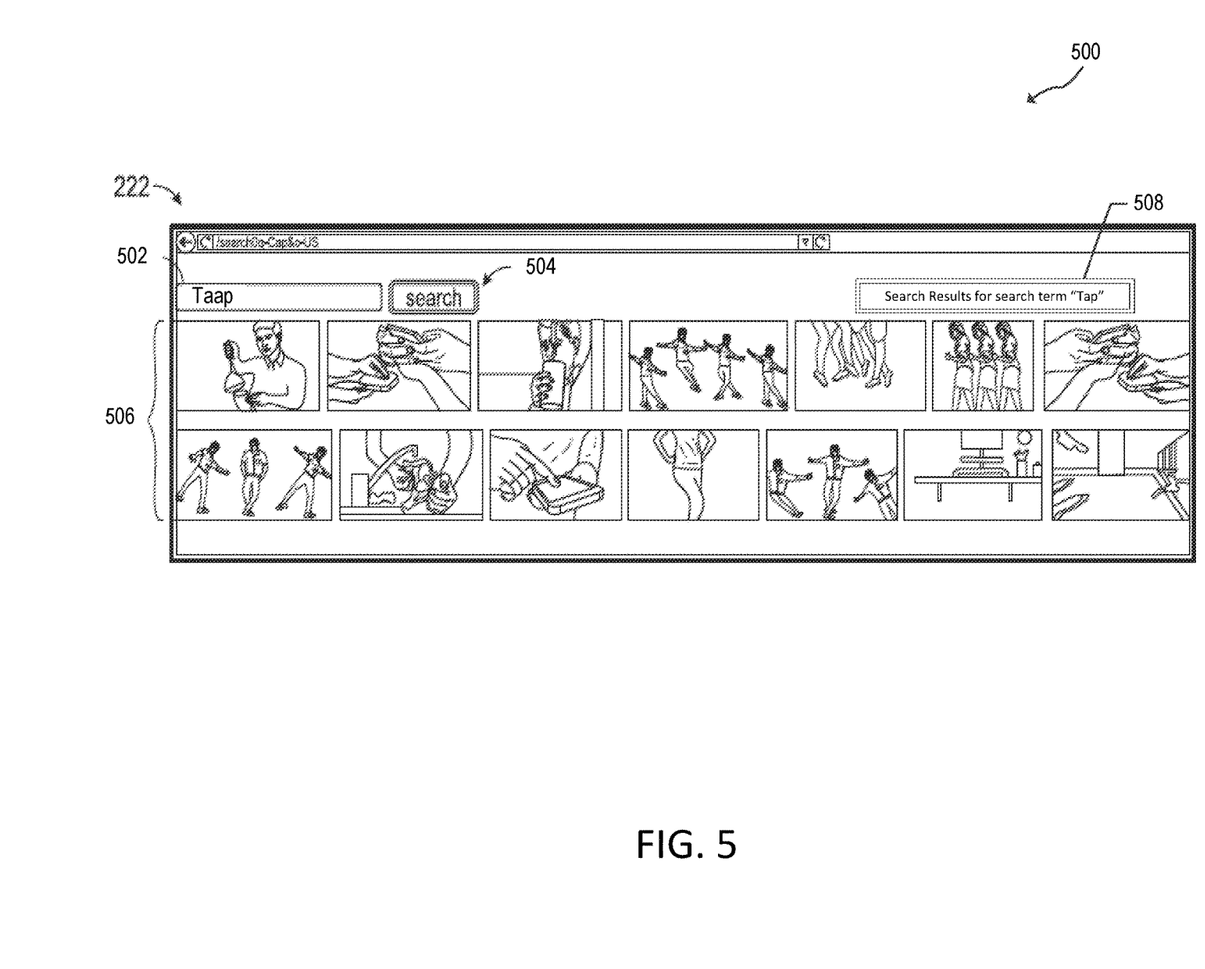
FIG. 5 illustrates a user interface for an image search using edit distance based spellcheck.

FIG. 5 illustrates a user interface 500 for image search using edit distance based spellcheck. Specifically, FIG. 5 provides an example user interface for initiating an image search via an application 222 responsive to a text-based image search query 502 in a given natural language. FIG. 5 also provides an example illustration of a prioritized listing of images 506 displayed in the user interface responsive to the image search query 502.

In FIG. 5, the user interface 500 of the application 222 includes an input section for receiving the image search query 502 and an output section for displaying a listing of images 506. The input section includes a search control 504 for initiating the image search using the received image search query 502. Search results responsive to the image search query 502 are provided for display via the output section. In this embodiment, the search results include images corresponding to the search term and/or phrase in the image search query 502.

In some embodiments, the user interface 500 includes a notification 508 for notifying the user of the image search service that the search results are responsive to a given search term. In this respect, the given search term indicated within the notification 508 may be a corrected version of the source word in the original search query if a spelling correction was rendered by the edit distance based spellcheck engine 244. In this example, the image search query 502 includes a misspelled source word "taap" (which includes an additional character 'a'). In turn, the notification 508 includes a graphical element indicating "search results for search term 'tap'," thereby indicating that the original image search query 502 was modified to include the spelling correction for initiating the image search. The notification 508 may include additional information about the spellcheck operation such as indicating whether the image search query 502 was spellchecked, or whether the image search query 502 included an unknown term and therefore the edit distance based spellcheck engine 244 was unable to provide a spelling correction for the source word. The notification 508 may be populated with information based on metadata associated with the spelling correction. The metadata may be generated by the edit distance based spellcheck engine 244, and forwarded with the selected candidate string to the image search engine 256 to be returned with the image search results.

Figure 6:
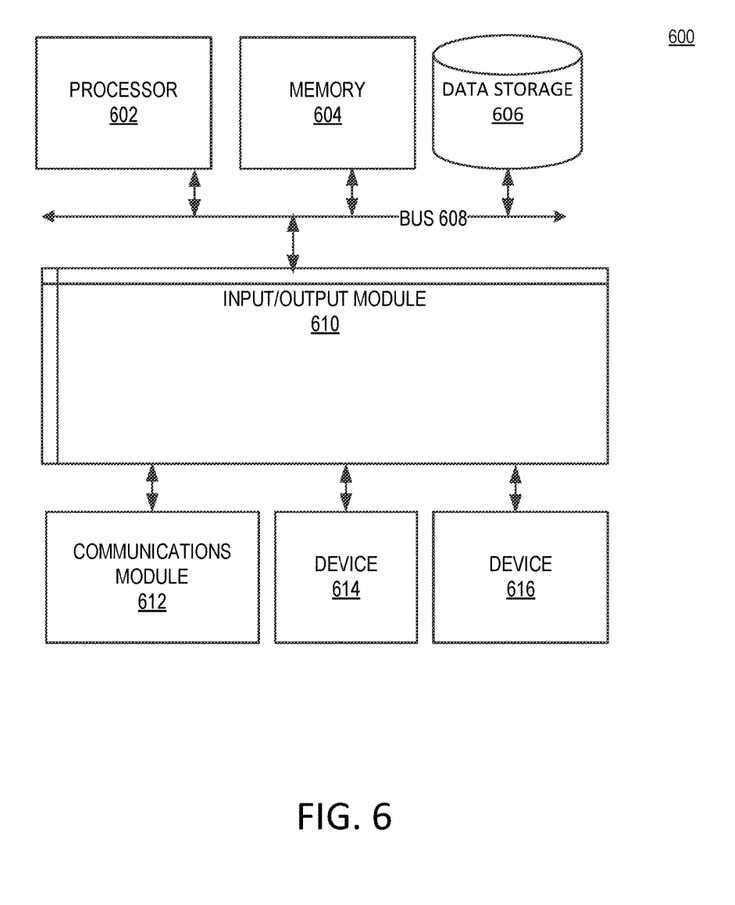
FIG. 6 is a block diagram illustrating an example computer system with which the client and server of FIG. 2 can be implemented.

FIG. 6 is a block diagram illustrating an exemplary computer system 600 with which the client 110 and server 130 of FIG. 1 can be implemented. In certain aspects, the computer system 600 may be implemented using hardware or a combination of software and hardware, either in a dedicated server, or integrated into another entity, or distributed across multiple entities.

Computer system 600 (e.g., client 110 and server 130) includes a bus 608 or other communication mechanism for communicating information, and a processor 602 (e.g., processor 212 and 236) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 (e.g., communications modules 218 and 238) include networking interface cards, such as Ethernet cards and modems. In certain aspects, the input/output module 610 is configured to connect to a plurality of devices, such as an input device 614 (e.g., input device 216) and/or an output device 616 (e.g., output device 214). Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 616 include display devices, such as a LCD (liquid crystal display) monitor, for displaying information to the user.

According to one aspect of the present disclosure, the client 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the images in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   determining a set of candidate terms from a plurality of character strings for each language model of a plurality of language models, each of the plurality of character strings having an edit distance that is equivalent to at least one spelling correction from a source term;
   processing the source term in an image search query from a requesting client device, the source term including at least one misspelled character;
   iterating through each term of the set of candidate terms to identify a candidate term having a smallest edit distance from the source term, the candidate term having a difference in length from the source term that is smaller than a predetermined character length threshold;
   modifying the source term in the image search query with the candidate term as a spelling correction for the source term; and
   providing the image search query modified with the candidate term to an image search service for retrieving one or more data items responsive to the image search query.

2. The computer-implemented method of claim 1, wherein each of the plurality of language models comprises a distribution waveform that indicates a language probability for each candidate term in the set of candidate terms for a corresponding natural language of a plurality of natural languages.

3. The computer-implemented method of claim 2, further comprising:
   determining whether a valid word exists among the plurality of character strings;
   selecting a character string with a highest language probability from the plurality of character strings when a valid word is determined to exist among the plurality of character strings; and
   providing the selected character string as the spelling correction.

4. The computer-implemented method of claim 3, further comprising:
   determining a first set of terms from the plurality of character strings that start with a same first character as that of the source term when no valid word exists among the plurality of character strings.

5. The computer-implemented method of claim 4, wherein iterating through each term of the set of candidate terms comprises:
   iterating through each term in the first set of terms to determine a length for each term in the first set of terms;
   comparing the length of each term in the first set of terms to a length of the source term; and
   determining a second set of terms whose difference in length from the source term is smaller than the predetermined character length threshold based on the comparison.

6. The computer-implemented method of claim 5, further comprising:
   determining whether at least one term exists in the second set of terms;
   refraining to return a spelling correction when no term is determined to exist in the second set of terms; and
   determining the edit distance between the source term and each term in the second set of terms when at least one term is determined to exist in the second set of terms.

7. The computer-implemented method of claim 6, further comprising:
   identifying one or more terms from the second set of terms whose edit distance is equivalent to the smallest edit distance in the second set of terms; and
   selecting one of the one or more terms with the highest language probability.

8. The computer-implemented method of claim 1, further comprising:
   determining a language probability for each term in the set of candidate terms, wherein the language probability indicates a likelihood of the term being used as a spelling correction for the source term, and wherein the candidate term has a language probability equal to a highest language probability in the set of candidate terms.

9. The computer-implemented method of claim 1, further comprising:
   generating metadata associated with the spelling correction, the metadata indicating whether the source term has been spellchecked; and
   providing the metadata with the identified candidate string.

10. The computer-implemented method of claim 1, wherein the spelling correction includes one or more of an insertion of a character, a deletion of a character, a substitution of a character, or a transposition of two adjacent characters.

11. A system comprising:
one or more processors;
a computer-readable storage medium coupled to the one or more processors, the computer-readable storage medium including instructions that, when executed by the one or more processors, cause the one or more processors to:
  determine a set of candidate terms from a plurality of character strings for each language model of a plurality of language models, each of the plurality of character strings having an edit distance that is equivalent to at least one spelling correction from a source term;
  process the source term associated with an image search query from a requesting client device, the source term including at least one misspelled character;
  iterate through a subset of the plurality of character strings in one of the plurality of language models that includes at least one character in common with the source term, the subset of the plurality of character strings including one or more character strings with a difference in length from the source term that is smaller than a predetermined character length threshold, the one or more character strings having an edit distance from the source term that is equivalent to a smallest edit distance in the subset of the plurality of character strings, each of the one or more strings having a respective language probability;
  select a character string with a highest language probability of being a spelling correction from the one or more character strings;
  modify the source term in the image search query with the selected character string as a spelling correction for the source term; and
  provide the image search query modified with the selected character string to an image search service for retrieving one or more data items responsive to the image search query.

12. The system of claim 11, wherein the edit distance is equivalent to at least one spellcheck operation from the source term, and wherein the instructions further cause the one or more processors to:
  compare each character string of the subset of the plurality of character strings to the source term; and
  determine whether at least one character string in the subset of the plurality of character strings has an edit distance equivalent to one spellcheck operation from the source term,
  wherein the character string is selected from the subset of the plurality of character strings when the at least one character string in the subset of the plurality of character strings as an edit distance equivalent to one spellcheck operation from the source term, and
  wherein the subset of the plurality of character strings is generated with language words having a plurality of characters in common with the source term when no character string in the subset of the plurality of character strings has an edit distance equivalent to one spellcheck operation from the source term.

13. The system of claim 11, wherein each of the plurality of language models comprises a distribution waveform that indicates a language probability for each character string in the subset of the plurality of character strings for a corresponding natural language of a plurality of natural languages.

14. The system of claim 11, wherein the subset of the plurality of character strings includes character strings that start with a first character in common with the source term.

15. The system of claim 11, wherein the instructions further cause the one or more processors to:
  determine an edit distance between each character string in the subset of the plurality of character strings and the source term; and
  iterate through each determined edit distance to identify the edit distance of a corresponding character string in the subset of the plurality of character strings that is equivalent to the smallest edit distance.

16. The system of claim 11, wherein the instructions further cause the one or more processors to:
  provide for transmission, to the requesting client device, in response to selecting the character string, a notification indicating that the image search query is being modified with the selected character string as a corrected version of the source term.

17. The system of claim 11, wherein the instructions further cause the one or more processors to:
  obtain a plurality of terms from one or more data sources for each natural language of a plurality of natural languages;
  determine a frequency at which the plurality of terms are searched in a respective natural language; and
  identify strings of characters from the plurality of terms having a frequency that exceeds a predetermined frequency threshold, the subset of the plurality of character strings being generated using the identified strings of characters.

18. The system of claim 11, wherein the instructions further cause the one or more processors to:
  determine a language probability for each character string in the subset of the plurality of character strings, the language probability indicating a likelihood that the character string is the intended source term for the image search query.

19. A computer-implemented method, comprising:
  receiving user input via an application on a client device;
  determining, on the client device, a source term in the user input, the source term including at least one misspelled character;
  generating, in response to the received user input, an image search query including the source term;
  providing for transmission the image search query over a connection to a server, the server including an edit distance based spellcheck service that determines a set of candidate terms from a plurality of character strings for each language model of a plurality of language models, each of the plurality of character strings having an edit distance that is equivalent to at least one spelling correction from a source term and iterates through each term of the set of candidate terms accessible to the server to identify a candidate term having a smallest edit distance from the source term, the candidate term having a difference in length from the source term that is smaller than a predetermined character length threshold, the source term in the image search query being modified with the candidate term as a spelling correction for the source term at the server, the image search query modified with the candidate term being provided to an image search service accessible to the server for retrieving one or more data items responsive to the modified image search query;
  receiving the one or more data items over the connection; and providing for display a listing of the one or more data items.

20. The computer-implemented method of claim 19, wherein the spelling correction includes one or more of an insertion of a character, a deletion of a character, a substitution of a character, or a transposition of two adjacent characters.

* * * * *